United States Patent [19]

Myer

[11] Patent Number: 5,548,923
[45] Date of Patent: Aug. 27, 1996

[54] ADJUSTABLE POST OR BOTANICAL COLLAR APPARATUS

[76] Inventor: C. Randolph Myer, 15 Forster Rd., Manchester, Mass. 01944

[21] Appl. No.: 464,409

[22] Filed: Jun. 5, 1995

Related U.S. Application Data

[63] Continuation-in-part of Ser. No. 276,208, Jul. 18, 1994, Pat. No. 5,430,971, which is a continuation-in-part of Ser. No. 137,664, Oct. 15, 1993, Pat. No. 5,361,536, which is a division of Ser. No. 913,464, Jul. 14, 1992, Pat. No. 5,279,069.

[51] Int. Cl.$^6$ .................................................. A01G 17/00
[52] U.S. Cl. .................................................. 47/25; 47/58
[58] Field of Search .................................. 47/25, 9, 8

[56] References Cited

U.S. PATENT DOCUMENTS

| | | |
|---|---|---|
| 4,858,378 | 8/1989 | Helmy . |
| 4,977,703 | 12/1990 | Blanc .......................... 47/25 |
| 5,361,536 | 11/1994 | Myer ............................ 47/25 |
| 5,367,822 | 11/1994 | Beckham . |

FOREIGN PATENT DOCUMENTS

| | | | |
|---|---|---|---|
| 3121590 | 5/1981 | Germany | 47/25 |

*Primary Examiner*—Henry E. Raduazo
*Attorney, Agent, or Firm*—Richard P. Crowley

[57] ABSTRACT

An adjustable collar apparatus and method to encircle a post or botanical item at its base, which collar apparatus comprises a plurality of at least three separate, identical, flat sheet panel elements. Each panel element has a generally arcuate, involute curved inner edge, a generally arcuate outer edge, a top and bottom surface, and first and second side edges, and is characterized by a dimple means positioned toward the first side edge and an elongated depressed area positioned toward the second side edge. The flat panel sheet elements are adjustably arranged in a side-edge, overlapping relationship, with the dimple means of one flat panel sheet element aligned with the elongated depressed area of an adjacent flat panel sheet element to form a collar apparatus about a post or the base of a botanical item. The dimple means is fastened in a snap-fit manner into the elongated depressed area by means of a blister edge formed at the bottom portion of the protruding area of the dimple and depressed area. At least one arcuate edge of the flat panel sheet element has a short, upwardly extending rim to form a continuous, peripheral raised rim for the assembled collar apparatus.

26 Claims, 1 Drawing Sheet

ADJUSTABLE POST OR BOTANICAL COLLAR APPARATUS

REFERENCE TO PRIOR APPLICATION

This application is a continuation-in-part of patent application U.S. Ser. No. 08/276,208, filed Jul. 18, 1994, now U.S. Pat. No. 5,430,971, which application is a continuation-in-part of patent application U.S. Ser. No. 08/137,664, filed Oct. 15, 1993, now U.S. Pat. No. 5,361,536, issued Nov. 8, 1994, which application was a divisional application of patent application U.S. Ser. No. 07/913,464, filed Jul. 14, 1992, now U.S. Pat. No. 5,279,069, issued Jan. 18, 1994.

BACKGROUND OF THE INVENTION

It is often desirable to eliminate or reduce the growth of grass or weeds about the base of a post, such as a generally upright post, or about the base of a tree or shrub. The elimination of such grass or weeds about the base eliminates the need for trimming the grass or weeds about the base and avoids damage to the base of the post from lawn mowers, weed-cutting apparatuses and the like. The growth of grass or weeds about the base of the post or tree can be controlled by eliminating the sunlight through the employment of a covered area about the base of the post or tree.

Tree- or post-collar apparati and methods which are inexpensive, easily assembled and used, and reusable, and which may be adjusted to encircle a post or irregular tree-stem trunk, to eliminate the growth of grass or weeds about the base being covered by the post collar, and which can be expanded to accommodate tree-trunk growth, have been described in U.S. patent application Ser. No. 08/276,208 and U.S. Pat. No. 5,361,536, which are incorporated herein by reference.

U.S. Pat. No. 4,858,378, issued Aug. 22, 1989 describes a modular landscape system. The system provides for the masking of a ground surface to prevent unwanted growth, for watering plants from a single location and for containing decorative material about a plant by the use of a radial outer rim. This system provides for interlocking of the modules in a rigid, non-slidable, non-adjustable manner.

U.S. patent application Ser. No. 08/276,208, now allowed, provides for a collar apparatus which is adapted to contain gravel, mulch, bark, or other particulate or fibrous material in a confined, selected space about the encircled post, tree or shrub base for improved aesthetic appearance and more effective elimination of sunlight.

It is now desired to provide for a collar apparatus having a plurality of sheet elements with integrally molded interlocking means, adapted to be interlocked together in a snap-fitted manner that is completely and easily adjustable by the user. The invention provides for an inexpensive, simpler and more flexible means of providing a covered area around a post or botanical item.

SUMMARY OF THE INVENTION

The invention concerns an improved collar apparatus for a post or botanical item and a method of encircling the post or botanical item with the collar apparatus.

The collar apparatus of the invention comprises a means to encircle a post or botanical item at its base, which collar apparatus comprises a plurality of at least three, e.g. three to six, separate, identical, flat panel sheet elements generally trapezoidal in shape, each flat panel sheet element having a generally arcuate inner edge, such as an involute curve to form a circular inner opening, and a generally arcuate outer edge, a top and bottom surface and first and second side edges. Each flat panel sheet element is characterized by a first dimple means, positioned toward the first side edge and, for example in one embodiment, extending generally intermediate between the inner and outer arcuate edges. Each flat panel sheet has a second, elongated, and generally arcuate depressed area positioned toward the second side edge and in one embodiment extending generally parallel to the inner and outer arcuate edges, preferably in the form of a generally inverted radial curve. The dimple means may comprise any shape, but optionally and preferably is circular in shape with a diameter ranging from about ¼ to ½ of an inch, and has a depth ranging from about ¼ to ½ of an inch. The elongated depressed area may be any length, but optionally and preferably is from about 3 to 6 inches in length and about ¼ to ½ of an inch in width. The depth of the depressed area, and the dimple means may be from ¼ to ½ of an inch; however, the depth of the dimple means should correspond generally to the depth of the elongated depressed area. Also, the width of the elongated depressed area should correspond to the width or diameter of the dimple means. While the dimple means and elongated depressed area may be formed on either surface; that is, protruding either upward or downward, both the dimple means and the elongated depressed area must protrude from the same surface area on the panel.

In use, the flat panel sheet elements are arranged in a side-edge overlapping relationship, with the first dimple means of one flat panel sheet element generally aligned with the second elongated depressed area of an adjacent flat panel sheet element to form a collar apparatus about a post or the base of a botanical item. The dimple means protruding from one surface of the flat panel sheet element is snap-inserted or snugly fitted into the depressed area of an adjacent flat panel sheet element, to permit slidable lateral adjustment of the flat panel sheet elements to form an inner circle of desired dimensions, and to fasten the flat panel sheet elements together.

The fastening of adjacent flat panel sheet elements is repeated with other flat panel sheet elements until all of the flat panel sheet elements have been assembled and fastened together except for one, creating an opening whereupon the assembled and fastened flat panel sheet elements can be positioned and adjusted to fit snugly about the base of a post or tree; and then securing the fastening means through the one opening to form an assembled collar apparatus. The dimple means and the elongated depressed area may both have a blister edge extending outwardly from the bottom portion of their protrusions to permit a snap-fit or other fastening means for the flat sheet panel elements in use.

In an optional embodiment, the elongated depressed area may be cut out of the flat panel sheet element, with the dimple means being inserted therein in a slidable manner. An arcuate opening similar to the depression also can be used. The integrally molded elongated depressed area, however, adds rigidity and stability to the panel.

Optionally and preferably, the outer or inner, or both, arcuate edge of the flat panel sheet element has a short, upwardly extending rim with the rim length starting slightly inwardly from each end of the outer arcuate edge so as to form, on assembly of the panel elements, a generally continuous peripheral rim with each end slightly overlapping the adjacent rim. After the collar apparatus is so assembled and positioned, gravel, mulch or other particulate or decorative material may be used to fill the collar apparatus, said material being held within the area defined by the short, upwardly extending rim on the outer, inner or both edges of the collar apparatus. The outer arcuate edge of the panel sheet element also has a short lip element extending outwardly from the bottom of the upwardly extending rim and at the same level as the flat panel sheet element. This lip element provides for further anchoring of the flat panel sheet element when dirt or rocks or other particulate material is placed on top of the lip element and around the outer perimeter to secure the lip element to the ground surface.

Optionally, each flat panel sheet element may include at least one hole or other holder for the insertion of a ground spike means to fasten or hold the flat panel sheet element to the ground. If desired, the panel element may contain a plurality of openings, holes or slots to permit the watering of the base of the plant, tree or shrub with which the collar apparatus is used.

In one embodiment, the collar apparatus means may be comprised of clear, moldable plastic for decorative purposes or, in a preferred embodiment, is comprised of an opaque, moldable plastic to prevent the penetration of sunlight through the collar apparatus into the ground to prevent or inhibit weed or grass growth. It has been found that a black plastic panel tends to accelerate springtime growth of botanical stems in use due to the absorption of heat into the root system.

The dimple means and depressed areas of the flat panel sheet elements are integrally molded into the plastic, such as a polyvinyl chloride resin plastic. Angular grooves may be molded into the flat surface of the sheet element to provide further support and rigidity to the sheet element in use. This permits the manufacturer to provide a thinner, more lightweight and inexpensive sheet element for the user with sufficient strength and flexibility for use and re-use.

In one method of preparation, the flat panel sheets may be prepared from thermoplastic sheet material by a vacuum-molding step followed by a diecutting. For example, 25–40 mil polyvinylchloride polymer in sheet form may be vacuum-molded at about 140° C. from the panel in the sheet and then the panels cut to size in a diecutting step.

The invention will be described for the purposes of illustration only in connection with certain embodiments; however, it is recognized that various changes, modifications, additions and improvements may be made to the illustrated embodiments by those persons skilled in the art, all falling within the spirit and scope of the invention.

DESCRIPTION OF THE EMBODIMENTS

Figure 1:
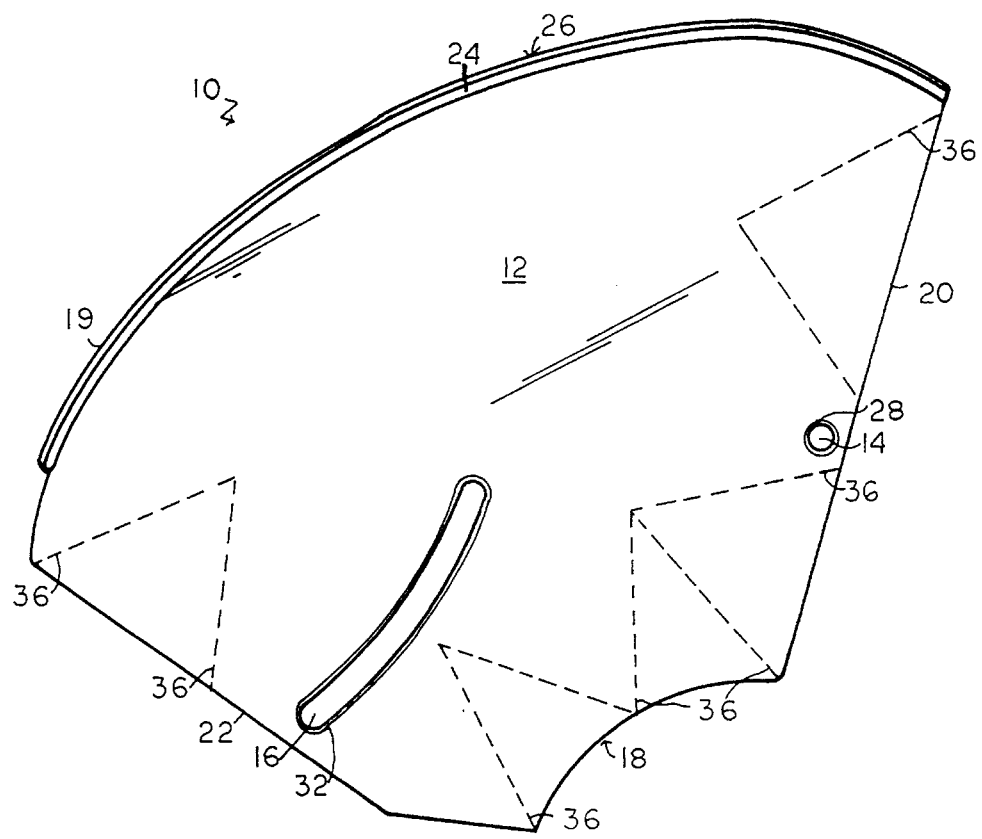
FIG. 1 is a top plan view of a flat panel sheet element of the collar apparatus of the invention.

As shown in the drawings, FIG. 1 is a top plan view of the trapezoidal, flat, panel sheet element 10 of the collar apparatus of the invention 40, with trapezoidal flat panel sheet area 12, arcuate involute curved inner edge 18, about 4" in length, arcuate outer edge 24, about 15" in length, and first 20 and second 22 side edges, the first side edge 20 being about 8" in length, and the second side edge 22 being about 7" in length. The outer arcuate edge 24 has a short, upwardly extending rim 26, starting at one end at the first side edge 20, and at the other end inwardly from the second side edge 22 about 2", and extending upwardly about a minimum of ½", e.g., ⅝". Each end of the upwardly extending rim 26 is tapered downwardly to provide for the overlapping of the rims to form a generally continuous peripheral rim for containing particulate matter. A small lip element 19 extends outwardly from the bottom of the upwardly extending ridge 26 to aid in securing the panel sheets 12 into the ground surrounding the outer perimeter of the assembled apparatus by means of backfilling particulate material onto the lip and securing the assembled sheet elements 12 to the ground. The flat panel sheet element 12 has a first dimple means 14 positioned about ¼" from the first side edge 20 and positioned intermediate between the inner 18 and outer 24 arcuate edges, and being about ⅜" in diameter, and a second elongated depressed area 16 positioned toward and near the second side edge 22 and extending about 4½" in length, generally intermediate between the inner 18 and outer 24 arcuate edges, in the form of an inverted radial curve. FIG. 1 also shows, indicated in broken lines, the angular grooves 36 which are molded into the flat panel sheet element 12 to provide for added strength and rigidity in the element.

Figure 2:
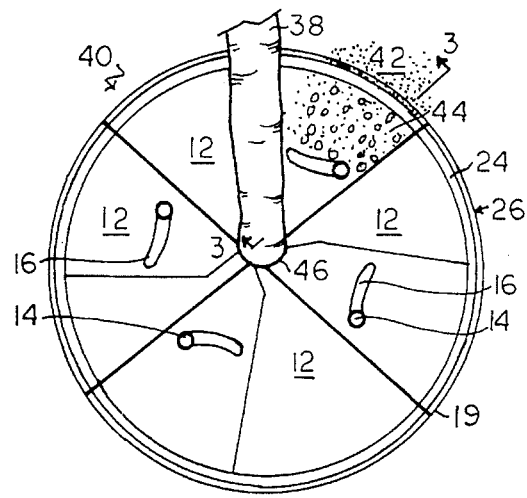
FIG. 2 top plan view of a plurality of the flat panel sheet elements of the invention fastened together.

FIG. 2 shows a top plan view of the assembled collar apparatus 40 with the sheet elements 12 placed in a snug-fit, circular manner about the base of a tree 38 and fastened together by means of the dimple means 14 being inserted in a snug, snap-fit manner into the elongated depressed area 16. Inner arcuate edge 18 is positioned close to the tree base, the inner arcuate edges 18 forming a circle 46 snug-fit around the tree base, while outer arcuate edges 24, with upwardly extending rims 26, form a circular pattern and border around the tree 38. A portion of the assembled apparatus 40 is shown filled with particulate matter 44, as it would be in use. The lip element 19 is indicated around the perimeter of the assembled sheet panel elements 12 with a portion shown having backfill 42 to provide for further anchoring of the panels.

Figure 3:
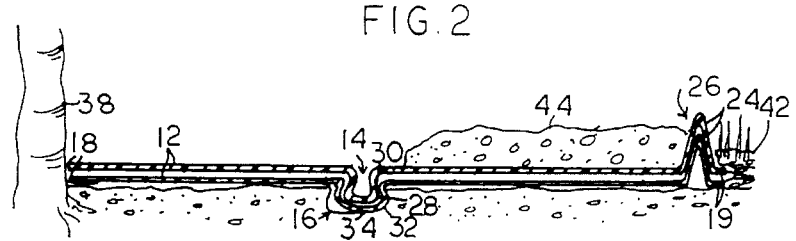
FIG. 3 is a cross sectional view of the embodiment of FIG. 2 cut along lines 3—3.

FIG. 3 shows an enlarged sectional view of the assembled tree collar apparatus of FIG. 2 cut along the lines 3—3. The flat panel sheet elements 12 are shown in their overlapped position, with the dimple means 14 of one element snap-fit and snugly inserted into the elongated depressed area 16. The outwardly extending blister edge 28 on the protruding element 30 of dimple means 14 permits the snap-fit insertion of the dimple means into the outwardly extending blister edge 32 of protruding element 34. The blister edges 28 and 32 permit the secure and adjustable fastening of the flat panel sheet elements 12 in use.

In use, a plurality of, e.g., generally from three to six, flat panel sheet elements 12 are aligned with the side edges one on top of the other, with the dimple means 14 overlapping and snap-inserted into the elongated depressed areas 16 on the respective sheets, with one panel being left unsecured. The plurality of connected sheet panel elements are then spread out and placed about the base of the tree or post that is to be protected. The flat sheet panels 12 are then slidably moved and adjusted respective to each other to form an inner circle 46, or other geometric shapes as desired depending on the number of panels used. The assembled, inner, arcuate edges of the panels 18 form an open circle, which circle or other shape is snugly close or adjacent to the base of the post, tree or shrub, typically with the panels 12 adapted to be spaced generally uniformly, and then the dimple means 14 is snap-inserted into the remaining elongated depressed area 16 of the final overlapping panel 12, to finish the enclosure, all dimple means 14 being secured by snap-fitting the blister edges 28 into the blister edges 32 of the elongated depressed areas 16, to secure the overlapping edges of the panels 12 together in the desired arrangement. The collar apparatus 10 is then weighted down, if desired, by particulate matter 44 being placed on the sheet panel elements 12, and further anchored by backfill 42 being backfilled onto the small lip element 19 on the outer rim 26.

The collar apparatus may be removed, when no longer required, by releasing or snapping out the dimple means 14 from the elongated depressed areas 16 in one of the panels and reused by rearranging, subtracting or adding panels according to the desired use. When fewer flat panels are used, the geometric shape may be of a rectangular, square or even triangular shape. When disassembled, the flat panel sheets of the collar apparatus of the invention can be easily stacked one on top of the other for easy storage, and compact packaging of the collar apparatus for purchase by a user.

The adjustable collar apparatus, as described and illustrated in the drawings, thereby provides for a simple, effective, easily packaged and stored, adjustable means and method to encircle a post, tree or shrub and to eliminate the need to trim grass or weeds along the protected and encircled area, and improved protection and aesthetic appearance by enabling the user to fill the post collar apparatus with gravel, mulch or other particulate matter. Further, the invention allows for simple and easy, integrally formed securing means that permits the adjustment of the size and diameter of the collar apparatus without the need of additional hardware. The improvement of depressed areas over cut out shapes in the panels allows for reduced production costs, and the elimination of additional hardware provides for a less expensive product that is easier to use.

What is claimed is:

1. An adjustable collar apparatus to encircle a post or botanical item at its base, which collar apparatus comprises:
   a) a plurality of at least three separate, identical, and generally trapezoidal flat panel sheet elements;
   b) each flat panel sheet element having a generally arcuate inner edge, a generally arcuate outer edge, first and second side edges, and a top and a bottom surface;
   c) each flat panel sheet element characterized by:
      i) a dimple means protruding from one surface and positioned toward the first edge;
      ii) an arcuate elongated means positioned toward said second side edge and extending generally parallel to said inner and outer arcuate edges; and
   d) the flat panel sheet elements adapted to be arranged in a side edge-overlapping relationship with said dimple means snugly engaged for slidable movement into each adjoining arcuate means and slidably movable therein to form an adjustable collar apparatus about the post of the base of a botanical item.

2. The collar apparatus of claim 1 wherein said inner arcuate edge of each panel comprises an involute curve adapted to form a generally circular inner opening about the post or botanical stem.

3. The collar apparatus of claim 1 wherein said flat panel sheet element includes a short, upwardly extending rim from at least one arcuate edge and substantially the length of the arcuate edge to form an assembled collar apparatus with a generally continuous peripheral rim about the arcuate edge.

4. The collar apparatus of claim 3 wherein the outer arcuate edge of said flat panel sheet element has a short, upwardly extending rim, with the rim length starting inwardly from each end of the outer arcuate edge.

5. The collar apparatus of claim 1 wherein the inner arcuate edge of each flat panel sheet element is angularly chamfered at one end and slightly rounded at the other end.

6. The collar apparatus of claim 3 wherein said flat panel sheet elements are opaque, integrally molded, plastic elements.

7. The collar apparatus of claim 1 wherein the arcuate means comprises a depressed area protruding from the same surface as the dimple means, and the arcuate means and the dimple means have blister edges extending peripherally outwardly from the lower portion of the protruding areas to permit snap-together fastening and slidable adjustment of said flat panel sheet elements and to retain said flat panel sheet elements together.

8. The collar apparatus of claim 1 wherein the arcuate means has a generally inverted radial curve.

9. The collar apparatus of claim 1 wherein the arcuate means is generally positioned intermediate and between the inner and outer arcuate edges.

10. The collar apparatus of claim 1 wherein the dimple means is circular in shape.

11. The collar apparatus of claim 1 wherein the arcuate means which comprises a depressed area and the dimple means both protrude from the same surface, either the top or the bottom surface.

12. The collar apparatus of claim 1 wherein the flat panel sheet element has at least one angular groove for added rigidity.

13. The collar apparatus of claim 1 wherein the depressed area is cut out of the flat panel sheet element.

14. The collar apparatus of claim 1 wherein the arcuate means comprises an arcuate opening.

15. In combination, a post or botanical item having a base extending generally upright and the collar apparatus of claim 1 on the ground encircling the post or base.

16. The combination of claim 15 which includes decorative-type material on the top face surface of the collar apparatus and contained by the rim of the outer arcuate edge.

17. An adjustable collar apparatus to encircle a post or botanical item at its base, which collar apparatus comprises:
   a) a plurality of at least three separate, identical, and generally trapezoidal flat panel sheet elements, comprised of opaque, integrally molded plastic;
   b) each flat panel sheet element having a generally arcuate involuted curve inner edge, a generally arcuate outer edge, first and second side edges, and a top and a bottom surface;
   c) each flat panel sheet element characterized by:
      i) a circular dimple means from about ¼ to ½ of an inch in diameter and from about ¼ to ½ of an inch in depth protruding from one surface and positioned toward the first edge;
      ii) an arcuate, elongated, depressed area from about 3 to 6 inches in length and from about ¼ to ½ of an inch in width protruding from the same surface as the dimple means, and positioned toward said second side edge, generally positioned intermediate and between the inner and outer arcuate edges, and extending generally parallel to said inner and outer arcuate edges in the form of an inverted radial curve;
      iii) blister edges extending peripherally outwardly from the lower portion of the protruding elements to permit snap-together fastening and slidable adjustment of said flat panel sheet elements and to retain said flat panel sheet elements together;
      iv) wherein said inner arcuate edge of each panel comprises an involute curve to form a generally circular inner opening about the post or botanical stem;
      v) a short, upwardly extending rim from at least one arcuate edge and substantially the length of the arcuate edge to form an assembled collar apparatus with a generally continuous peripheral rim about the arcuate edge, the rim having at the bottom outside edge a small lip element extending outwardly therefrom;

vi) a short, upwardly extending rim on the outer arcuate edge of said flat panel sheet element, with the rim length starting inwardly from each end of the outer arcuate edge;

vii) the inner arcuate edge of each flat panel sheet element is angularly chamfered at one end and slightly rounded at the other end; and d) the flat panel sheet elements arranged in a lateral, side edge-overlapping relationship with said dimple means snugly engaged for slidable movement into each adjoining elongated depressed area and slidably movable therein to form an adjustable collar apparatus about the post or the base of a botanical item.

18. A method for the protection of a post or botanical item, which method comprises:

a) providing an adjustable collar apparatus, which comprises:
 i) a plurality of at least three separate, identical, and generally trapezoidal flat panel sheet elements;
 ii) each flat panel sheet element having a generally arcuate inner edge, a generally arcuate outer edge, first and second side edges, and a top and a bottom surface;
 iii) each flat panel sheet element characterized by:
  a) a dimple means protruding from one surface and positioned toward the first edge;
  b) an arcuate elongated depressed area protruding from the same surface as the dimple means and positioned toward said second side edge and extending generally parallel to said inner and outer arcuate edges;

b) providing at least three of the flat panels sheet elements to be used collectively, which collective use comprises;
 i) overlapping the sheet panel elements to form a desired shape;
 ii) snap-inserting the dimple means of each element into the depressed area of each element, leaving one section open;
 iii) surrounding the post or botanical item with the collar apparatus;
 iv) adjusting the shape of the collar apparatus;
 v) closing the collar apparatus by snap-inserting the remaining dimple means into the remaining depressed area, and
 vi) filling the collar apparatus with selected particulate matter.

19. A flat panel sheet element adapted for use with other identical elements to form an adjustable collar apparatus to encircle a post or botanical item at its base, which flat panel element comprises:

a) a generally trapezoidal, flat panel sheet having a generally arcuate inner edge, a generally arcuate outer edge, first and second side edges and a top and bottom surface;

b) dimple means protruding upwardly from one surface and positioned generally toward the first edge; and c) an arcuate elongated means positioned generally toward the second edge and extending generally parallel to said inner and outer arcuate edges,
 whereby the dimple means is adapted to be snugly engaged in the arcuate means of an adjacent, identical flat panel sheet element for slidable movement therein to form with at least one other identical sheet panel element an adjustable collar apparatus.

20. The element of claim 19 wherein the inner arcuate edge comprises an involute curve so that the assembled plurality of flat panel sheet elements form a circular opening about the base or botanical item.

21. The element of claim 19 wherein the element includes a short, upwardly extending rim from at least one of the inner or outer arcuate edges.

22. The element of claim 19 wherein the element comprises an opaque, molded plastic element.

23. The element of claim 19 wherein the arcuate elongated means forms an inverted radial curve.

24. The element of claim 19 wherein the dimple means comprises a generally circular dimple.

25. The element of claim 19 wherein the arcuate means comprises an arcuate depressed area in the element, the depressed area adapted to receive therein a dimple means.

26. The element of claim 19 wherein the arcuate means comprises an elongated opening in the element, the opening adapted to receive therein a dimple means.

* * * * *